(12) United States Patent
Jansen

(10) Patent No.: US 10,921,436 B2
(45) Date of Patent: Feb. 16, 2021

(54) MIMO RADAR CODING FOR RESOLVING VELOCITY AMBIGUITY

(71) Applicant: NXP B.V., Eindhoven (NL)

(72) Inventor: Feike Guss Jansen, Eindhoven (NL)

(73) Assignee: NXP B.V., Eindhoven (NL)

( * ) Notice: Subject to any disclaimer, the term of this patent is extended or adjusted under 35 U.S.C. 154(b) by 248 days.

(21) Appl. No.: 16/101,846

(22) Filed: Aug. 13, 2018

(65) Prior Publication Data

US 2020/0049812 A1    Feb. 13, 2020

(51) Int. Cl.

| G01S 13/64 | (2006.01) |
|---|---|
| G01S 7/35 | (2006.01) |
| G01S 13/58 | (2006.01) |

(52) U.S. Cl.
CPC .............. *G01S 13/64* (2013.01); *G01S 7/352* (2013.01); *G01S 13/583* (2013.01); *G01S 2007/356* (2013.01)

(58) Field of Classification Search
CPC ...... G01S 13/64; G01S 13/528; G01S 13/583; G01S 2007/356
USPC .......................................................... 342/84
See application file for complete search history.

(56) References Cited

U.S. PATENT DOCUMENTS

| 9,541,638 | B2* | 1/2017 | Jansen | G01S 13/582 |
|---|---|---|---|---|
| 9,746,549 | B1* | 8/2017 | Parker | G01S 13/5244 |
| 2010/0245154 | A1* | 9/2010 | Szajnowski | G01S 7/023 342/90 |
| 2012/0001791 | A1 | 1/2012 | Wintermantel | |
| 2018/0024224 | A1* | 1/2018 | Seller | G01S 5/0221 342/461 |

OTHER PUBLICATIONS

D. Rabideau, "Doppler-Offset Waveforms for MIMO Radar," IEEE RadarCon, 2011, pp. 965-970; 6 pages.
Sun, H., "Analysis and Comparison of MIMO Radar Waveforms", International Radar Conference 2014.

* cited by examiner

*Primary Examiner* — Erin F Heard
*Assistant Examiner* — Michael W Justice

(57) ABSTRACT

An apparatus for resolving velocity ambiguity in a MIMO RADAR includes a plurality of transmit channels and a virtual channel Each transmit channel includes a transmit antenna configured to transmit a plurality of chirps. Each chirp includes a frequency ramp of a transmit frequency of the respective transmit channel. Each transmit channel is orthogonal to another transmit channel and to a virtual transmit channel. A waveform generator is configured to generate a local oscillator (LO) signal for each transmit channel. A frequency offset circuit is configured to modify the LO signal of each transmit channel with a respective frequency offset to generate the respective transmit frequency.

19 Claims, 8 Drawing Sheets

MIMO RADAR CODING FOR RESOLVING VELOCITY AMBIGUITY

FIELD

This disclosure relates generally to Multiple Input Multiple Output (MIMO) RADAR systems, and more specifically to resolving a velocity ambiguity of a reflector by coding MIMO RADAR transmitter frequencies.

BACKGROUND

A common method for improving the angular resolution of automotive RADAR systems includes the use of multiple transmitter antennas. Automobiles increasingly use RADAR systems to detect changes to a surrounding environment, such as a proximity to another automobile for blind spot detection, or for detection of a leading vehicle for improved cruise control. Accurate RADAR is also integral to autonomous vehicle control systems. In a MIMO RADAR system, a virtual array is formed with a number of array elements equal to a product of a number of transmitter and receiver antennas. The increased aperture of a MIMO RADAR compared to a single transmitter system increases the capability to separate objects based upon their Direction Of Arrival (DOA). However, the MIMO RADAR transmitter must transmit orthogonal waveforms from the multiple transmitters to separate the combined response on the receiver side.

Orthogonality can be realized by encoding the transmitted RADAR waveforms. For example, waveform orthogonality can be achieved in a RADAR system by transmitting a Frequency Modulated Continuous Wave (FMCW) waveform at different time instants, at different center frequencies or by changing a phase or amplitude of the FMCW waveform.

In traditional automotive RADAR systems, the maximum Doppler frequency is typically insufficient to prevent velocity ambiguity, particularly when using multiple transmit antennas. Techniques to retrieve the true Doppler frequency from a reflected target (e.g., "reflector"), when velocity ambiguity occurs, have typically relied upon obtaining two measurements per FMCW waveform. Two measurements per FMCW waveform can be achieved with a waveform having both an "up-chirp" with increasing frequency and a "down-chirp" with decreasing frequency. However, the requirement for an FMCW waveform to include both an up-chirp and a down-chirp complicates system implementation because the up-chirp and down-chirp need to be associated with each other for RADAR processing.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods described herein provide for the resolution of velocity ambiguity in a MIMO RADAR system by forming a virtual transmitter whose reflection from a reflecting target (e.g., a reflector), is easily distinguished from reflections initiated from other physical transmitters. Hence, the amount of cyclical shift of a Doppler waveform at a receiver of the RADAR is both determinable and compensable.

The embodiments of this disclosure use transmit center frequency offsets to ensure that each transmitter is orthogonal with respect to any other physical transmitter and the virtual transmitter. Specifically, the frequency offsets use a Doppler Division Multiple Access (DDMA) method. While the use of DDMA will decrease the maximum Doppler frequency by a factor equal to the number of transmit antennas, the frequency offsets formed by this method are minimal, resulting in maximum coherence of a RADAR channel response in the presence of complex targets. Furthermore, all transmit antennas are simultaneously active, which increases the Signal to Noise Ratio (SNR) of the received signal in a practical RADAR system compared to the simplistic sequential-in-time transmission.

A plurality of FMCW chirps are transmitted by each transmitter, wherein each chirp has a single ramp phase providing a single measurement. The maximum Doppler frequency that can be unambiguously measured by a MIMO RADAR is inversely proportional to the duration of a single ramp of an FMCW waveform. Compared to systems that use two measurements per chirp to resolve velocity ambiguity, the single measurement simplifies the implementation of the RADAR system, obviating the need to associate measurement data from an up-chirp and a down-chip.

Figure 1:
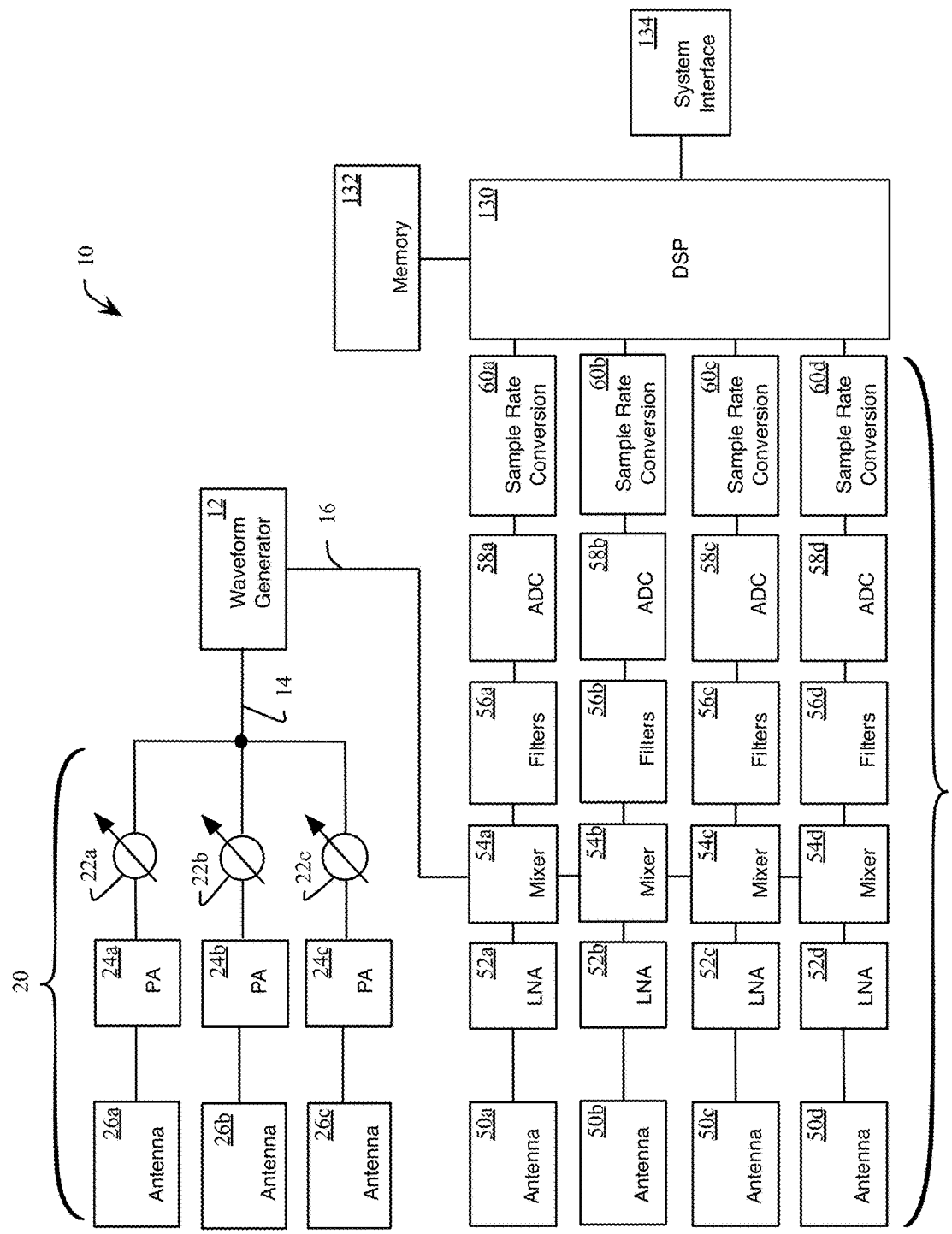
FIG. 1 is a functional block view of a system for MIMO RADAR coding for resolving velocity ambiguity, in accordance with an embodiment of the present disclosure.

FIG. 1 shows an embodiment 10 of a MIMO RADAR system in accordance with an embodiment of the present disclosure. A waveform generator 12 generates a Local Oscillator (LO) signal 14 for transmitting RADAR signals and an LO signal 16 for receiving RADAR signals. In various embodiments, the LO signal 14 and the LO signal 16 are the same frequency and are ramped from a start frequency to a stop frequency, centered on a center frequency. In the embodiment 10 the LO signal 14 feeds a plurality of transmit channels 20. A phase of the LO signal 14 is offset by phase rotators 22a, 22b and 22c, (generally 22), for each ramp. By varying the phase of the three transmit channels 20 for each chirp, the DDMA frequency modulation, required to produce the desired frequency offset to ensure orthogonality, is approximated by a piecewise constant phase modulation on a chirp by chirp basis.

Using the phase rotators 22, greatly simplifies the hardware required by the MIMO RADAR system 10 for generating the frequency offsets. In one embodiment, the phase rotators 22 are binary phase shifters. In another embodiment, the phase rotators 22 are selectable invertors, providing a rotation of 180 degrees. The outputs of each of the phase rotators 22 are amplified with respective Power Amplifiers (PA) 24a, 24b and 24c, (generally 24), and transmitted by respective antennas 26a, 26b, and 26c, (generally 26). The transmit channels 20 include the three physical channels depicted in FIG. 1 plus a fourth virtual channel (not shown). The waveform coding of the MIMO RADAR system 10 assumes four physical channels, although only three are physically present, and the fourth is virtual. The virtual channel represents an unused code in the waveform coding. The virtual channel does not physically transmit a signal. Hence, RADAR reflections associated with the virtual channel are distinguishable from RADAR reflections associated with the three physical channels by the strength of the return of the virtual channel being substantially zero (e.g., within a noise threshold associated with typical manufacturing and environmental limits).

In one embodiment, the MIMO RADAR system 10 is coded with a 4×4 Walsh-Hadamard matrix with phase invertors 22. In other embodiments, coding is performed with a Fourier matrix with phase rotators and an array having a number of rows and columns being a power of two. Similar to the embodiment based on the Walsh-Hadamard matrix, the Fourier matrix will have a number of columns being at least one greater than the physical number of transmit channels 20.

In a typical RADAR system, a signal modulated according to a specific waveform principle is transmitted at a certain carrier frequency (e.g., 79 GHz). The reflected signals are down-converted to baseband signals by the analog receiver and processed by a digital processor. In these processing steps reflectors are detected and their distance to the RADAR, the relative radial velocity and the angle between the object and the RADAR are estimated.

Frequency modulated continuous wave (FMCW) is a suitable waveform for automotive RADAR systems due to its accuracy and robustness. An implementation, in which a sequence of short duration frequency chirps is transmitted, has favorable properties with respect to the detection of objects moving with a non-zero relative radial velocity, or with similar Ground Moving Target Indication (GMTI) systems.

The MIMO RADAR system of FIG. 1 further includes a plurality of receive channels 48. The receive antennas 50a, 50b, 50c and 50d, (generally 50) receive a reflection from a reflector when a transmission from the transmit channels 20 is directed towards the reflector. Each reflection received by the antennas 50 is amplified by a respective Low Noise Amplifier (LNA) 52a, 52b, 52c, and 52d, (generally 52). Each output of the LNAs 52 is down-converted by a respective mixer 54a, 54b, 54c and 54d, (generally 54) modulated by the LO signal 16, wherein the frequency of the LO signal 16 used to down convert the reflected signal from a reflector, has the same frequency as the LO signal 14.

Each output of the mixers 54 are filtered with respective low pass filters 56a, 56b, 56c, and 56d, (generally 56). Each output of the filters 56 is converted by a respective Analog to Digital Converter (ADC) 58a, 58b, 58c and 58d, (generally 58). In one example embodiment, each of the ADCs 58 is a sigma-delta converter or a sampling ADC. In some embodiments, each output of the ADCs 58 is converted with a respective sample rate conversion circuit 60a, 60b, 60c and 60d, (generally 60). Each output of the sample rate conversion circuit 60 is received by a Digital Signal Processor (DSP) 130 for further processing. In some embodiments, the DSP 130 is substituted by another processor capable of executing Fourier transform operations. In some embodiments, the DSP 130 is connected to a memory 132. In example embodiments, the memory 132 is used for one or more of storing program code configured to control the program execution of the DSP 130 (e.g., Fourier transforms), and for storing interim or final results of transforms. In some embodiments, the memory 132 complements memory included with the DSP 130. In various embodiments, the DSP is connected to a system interface 134 for user interaction. Example embodiments of the system interface 134 include a display, a keyboard, a mouse or a connection to another system configured to further process data from, or to control, the DSP 130. In some embodiments, the DSP 130 controls the waveform generator 12 to generate frequency chirps.

Figure 2:
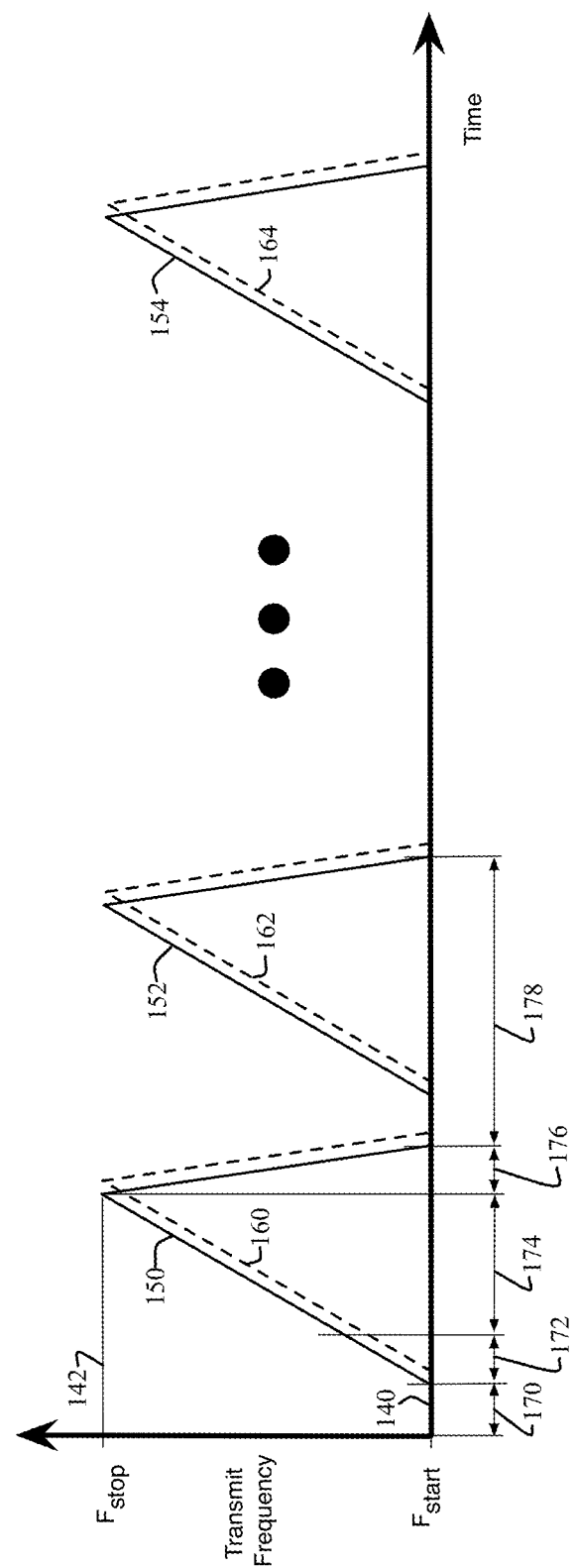
FIG. 2 is a graphical view of a chirp sequence of an FMCW RADAR system.

FIG. 2 shows an embodiment of an FMCW chirp sequence of a RADAR system. The chirp sequence transmits a signal in the form of a sine wave, ramped with an oscillation frequency, from a start frequency 140 to a stop frequency 142. In the embodiment 10 of FIG. 1, the transmitted signal is an amplified sinusoidal signal derived from the LO signal 14, with a frequency offset to ensure orthogonality. A series of transmitted up-chirps, transmitted by the transmit channels 20, is shown as 150, followed by 152 and terminating with 154 at the end of a CPI. The corresponding received signals, received by the receive channels 48, is shown respectively as 160 and 162 to 164. The received signals are delayed in time with respect to the transmitted signals, with a time delay due to the round trip propagation time between the RADAR system and the reflecting object. The received signals 160 and 162 to 164 are time-delayed signals that are attenuated and phase rotated versions of the respective transmitted signals 150 and 152 to 154. This phase rotation occurs because the received signals are formed from sequential samples of a time-variant sinusoidal waveform. When the relative velocity between the RADAR system and the reflecting object is greater than zero, an additional phase rotation occurs.

The instantaneous frequency difference between transmitted signals 150 and 152 to 154 and received signals 160 and 162 to 164 is constant for at least part of the duration of a frequency ramp. The time periods 170, 172, 174 and 176 refer to the dwell, settling, acquisition and reset times respectively, the summation of which is equal to the chirp time 178. The summation of the settling time 172 and the acquisition time 174 is equal to the ramp time. The acquisition time 174 is the measurement phase, shown in FIG. 2 as an up-chirp. The ramp time (Tramp) includes the summation of the settling time 172 and the acquisition time 174. The Pulse Repetition Frequency (Fprf) is the inverse of Tchirp 178.

The result of the down conversion and low pass filtering operations of the receive channels 48 is a summation of sine waves oscillating at their respective beat frequencies defined by equation (1) wherein "D" is the average distance between the reflector and the RADAR antennas 26 and 50, and "co" is the speed of light:

$$F\text{beat}=[(F\text{stop}-F\text{start})/T\text{ramp}]*2D/co] \tag{1}$$

When the relative radial velocity "v" between the RADAR and the reflector is not zero, the corresponding Doppler frequency is added to the beat frequency. The Doppler frequency is defined by equation (2):

$$Fdoppler=2v*Fcenter/co \quad (2)$$

In the RADAR system 10 of FIG. 1, the duration of the chirp is very short (e.g., less than 100 microseconds), relative to the frequency deviation of at least several tens of MHz. As a result, the Doppler frequency magnitude is very small compared to the beat frequency magnitude, and thus can be ignored in the calculation of the distance. However, the Doppler component will change the phase of the received frequency ramp. As time progresses the distance between the RADAR and the reflector changes. Between successive chirps, the change in distance is very small (e.g., a few millimeters). However, this distance change causes a significant rotation of the phase of the received signal. This linear increase in phase over the multiple chirps of the CPI is measured with a FFT and is a direct measurement of the Doppler frequency.

Figure 3:
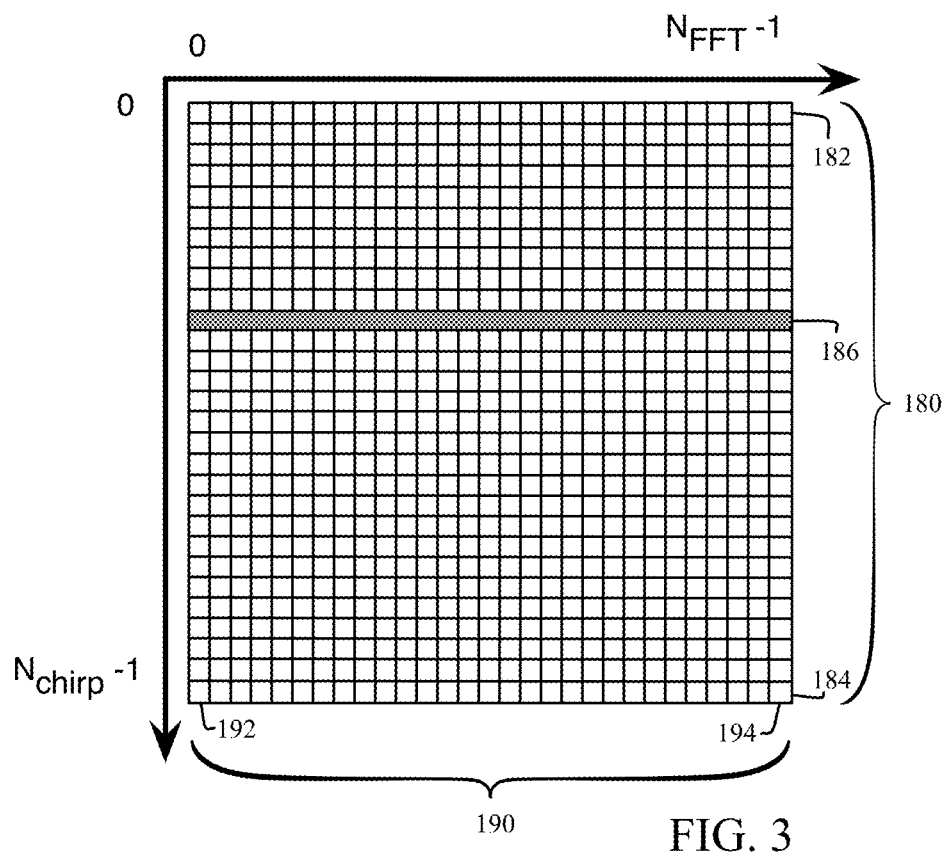
FIG. 3 is a graphical view of a series of received samples transformed by a Fast Fourier Transform (FFT) into a plurality of range gates.
Figure 4:
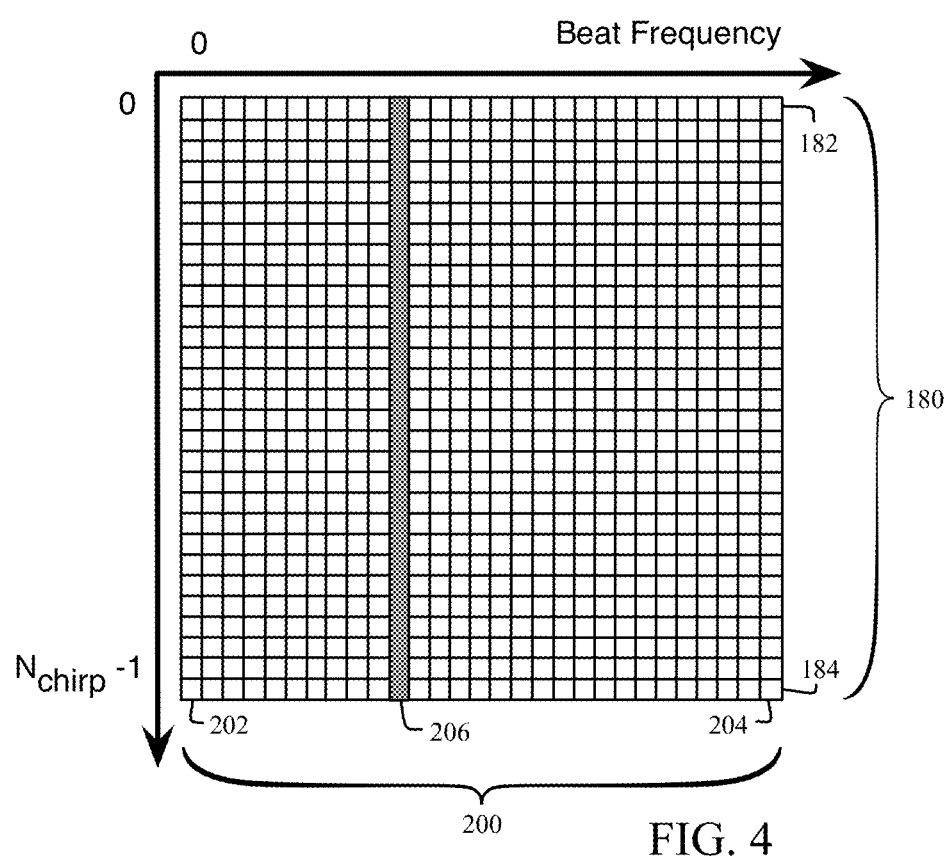
FIG. 4 is a graphical view of the transformed samples of FIG. 3 further transformed by an FFT into a series of Doppler gates.

FIG. 3 and FIG. 4 describe the transformation of the signals received by the receive channels 48 into a two dimensional (2-D) matrix of complex values defining range and velocity attributes of reflectors detected by the RADAR. Referring to FIG. 3, the time-domain samples of one chirp from the receive channels 48 are windowed (e.g., with a Chebyshev window). Thereafter, the samples are converted with a 2-D Fourier transform. In some embodiments, the Fourier transform is an FFT. The process of windowing and transforming with a Fourier transform continues until all transformed values are stored in a plurality of rows 180, starting with a first row 182 and ending with a last row 184. Each row (e.g., 186), defines a range gate representing a quantized distance between the RADAR and the reflector. Each row includes a plurality of Fourier transforms 190 starting with a first column 192 and ending with a last column 194.

Referring to FIG. 4, a window function is applied to a single column (e.g., 206). In one embodiment, the window function is a Chebyshev window. Thereafter, a Fourier transform is applied to each of the plurality of columns 200 having a plurality of Fourier transformed samples, starting with the first column 202 and ending with the last column 204. Each column defines a Doppler gate representing a Doppler range indicating the relative velocity of the reflector. Each Doppler gate has a plurality of complex value samples, including values corresponding to each transmit channel 20 with frequency offsets for orthogonality.

Figure 5:
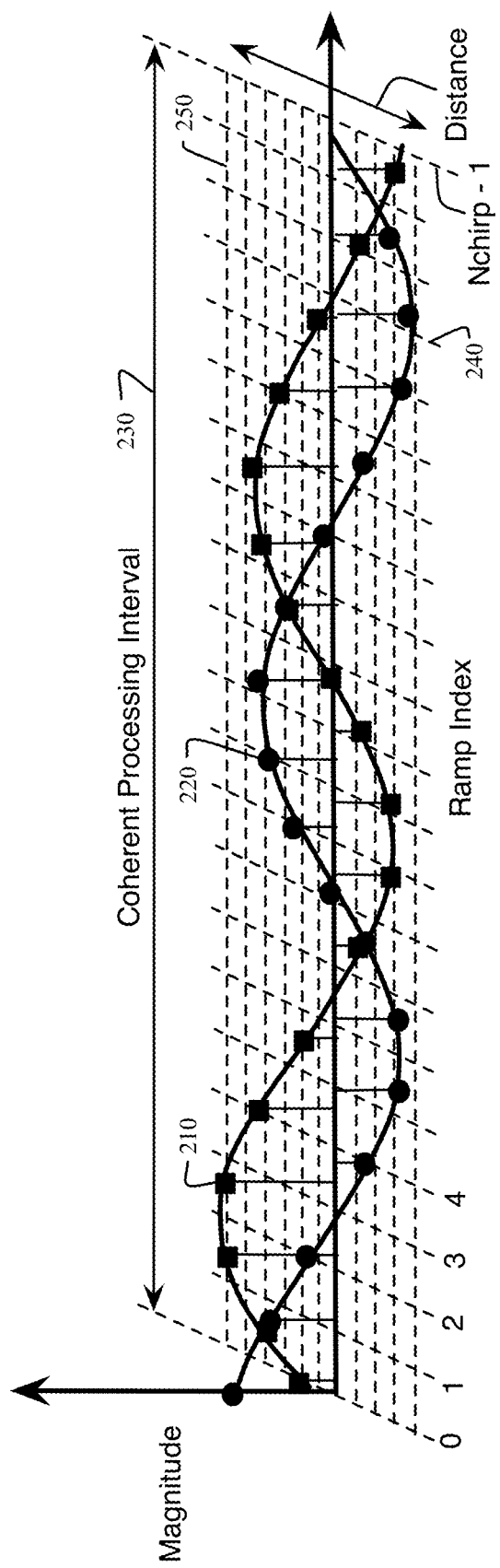
FIG. 5 is graphical view of real and imaginary components of a single reflector at a single range gate for a series of chirps corresponding to one Coherent Processing Interval (CPI).

FIG. 5 shows the real 210 and imaginary 220 time-domain components of data corresponding to a single reflector at a single range gate 250 for a series of chirps 240, (spanning from 0 to Nchirp−1), corresponding to one Coherent Processing Interval (CPI) 230. The complex spectral value formed by 210 and 220 rotates over the plurality of frequency ramps, indexed by the ramp index 240, at the Doppler frequency since the phase position of each reflection uniformly changes from one ramp to the next ramp. The magnitude of the Doppler frequency is estimated by transforming a vector of the samples shown in FIG. 5 to the frequency domain and estimating a position of the spectral peak.

In some embodiments, multiple reflectors are present in the field of view of the RADAR system. In this case the output of the down conversion operation is a summation of sine waves oscillating at the beat frequencies corresponding to the distances to the reflecting objects. The targeted RADAR system is equipped with multiple receive antennas 50 as depicted in FIG. 1. These antennas can be used to estimate the direction under which the reflected signal was received, based upon the difference in phase shift of the received signals. This disclosure describes the use of multiple encoded transmit channels 20, which are received as a summation of all simultaneously transmitted waveforms by the receive channels 48. The transmit channels 20 are uniquely separated by their frequency offsets. Each transmit channel 20 is encoded by modulating each transmitted waveform with a linearly increasing phase shift.

For the DDMA method, the phase encoding applied to the transmitted signals shifts the Doppler spectrum of each FMCW signal by a fraction of the Fprf relative to an unencoded signal. Fprf is the inverse of Tchirp (e.g., the inverse of the sum of the dwell time 170, the settling time 172, the acquisition time 174 and the reset time 176 shown in FIG. 2). Thus, FMCW signals transmitted by different transmit antennas 26 can be separated by the DSP 130 in the Doppler frequency domain. By applying DDMA to each transmit channel 20, the Doppler spectrum is now divided into "M+1" parts, wherein "M" refers to the number of physical transmit channels 20, exclusive of the virtual channel. The spectral width of each part is given by the following equation (3):

$$B=1/[(M+1)*Tchirp] \quad (3)$$

In a worst-case example, where two vehicles approach each other at an individual speed of 150 km/h, the Doppler frequency can be as high as 44 kHz for a 79 GHz center frequency. For a traditional RADAR with three transmitters, a chirp duration of 3.8 microseconds would be required. Such a system would use a very steep frequency ramp resulting in high frequencies. The implementation of such a system would be very expensive. To keep costs manageable, the chirp duration is extended. As the bandwidth for each transmitter is now too low, aliasing in the Doppler domain will occur. When spectral aliasing occurs, the Doppler frequency of a reflector exceeds "B" Hz and will fall into the spectrum designated for another transmitter.

Figure 6:
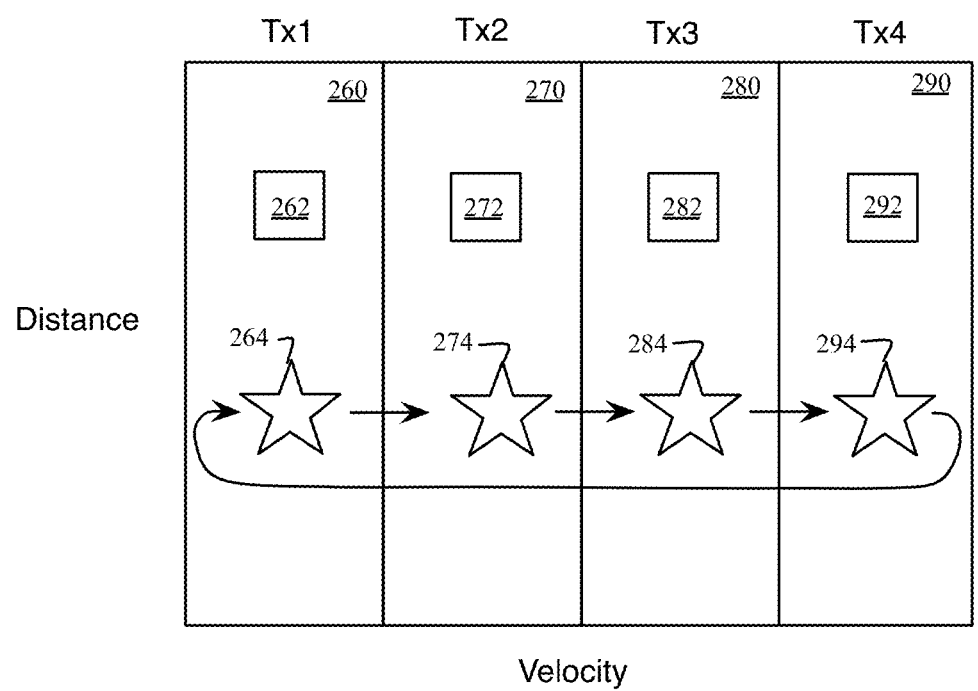
FIG. 6 is a graphical view showing spectral aliasing in the Doppler domain for four RADAR transmitters.

Referring to FIG. 6 the effect of the resulting velocity ambiguity is shown with two reflectors and four transmit channels 20. The first transmit channel 260 generates a reflection 262 from a stationary reflector and a reflection 264 from a moving reflector. The second transmit channel 270 generates a reflection 272 from the static reflector and a reflection 274 from the moving reflector. The third transmit channel 280 generates a reflection 282 from the static reflector and a reflection 284 from the moving reflector. The fourth transmit channel 290 generates a reflection 292 from the static reflector and a reflection 294 from the moving reflector. The four reflections 262, 272, 282 and 292 from the static reflector are uniquely associated with their respective transmit channels 260, 270, 280 and 290.

In contrast, velocity ambiguity is introduced by a moving target when the target moves faster than the chirp duration can resolve. Accordingly, the reflections 264, 274, 284 and 294 from the moving reflector will shift right by one or more Doppler frequency bands. By replacing one of the four transmit channels 20 with a virtual channel, whose reflection is easily distinguished from the channels having physical transmitters, the amount of cyclical shifting is determinable. By removing the cyclical shift, the velocity ambiguity is removed and the virtual MIMO array is restored. Consequently, the target direction of arrival and velocity are also resolved.

Figure 7:
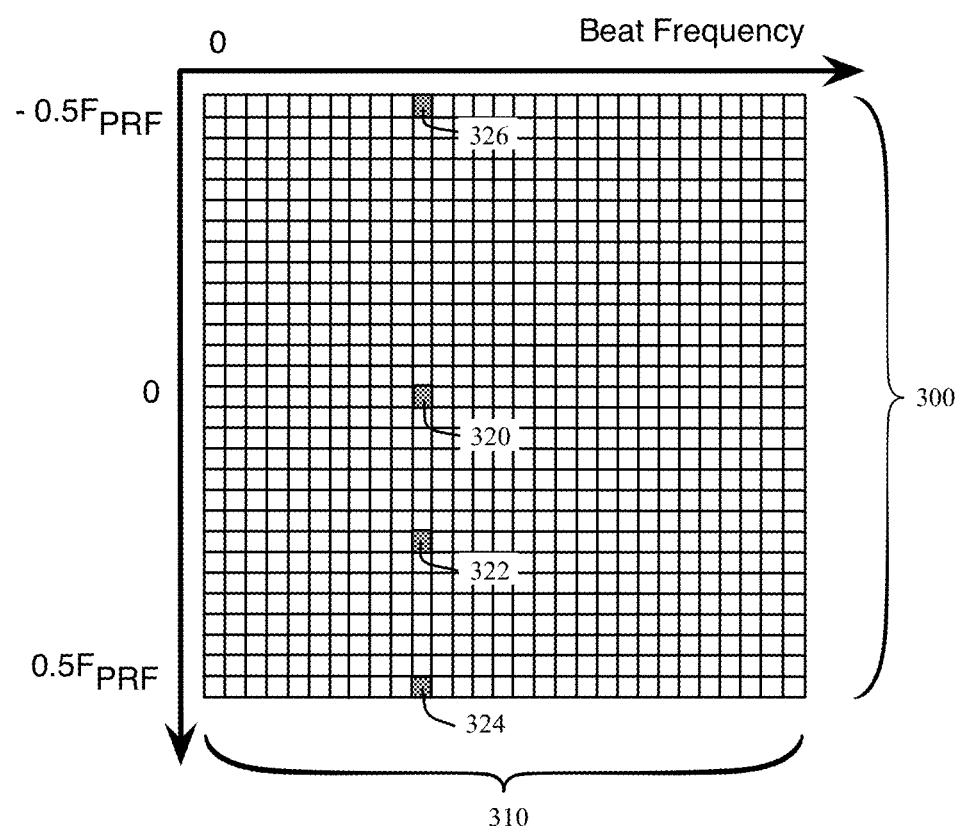
FIG. 7 is a graphical view of the matrix of range gates and Doppler Gates of FIG. 4, showing spectral peaks corresponding to detected reflectors at one Doppler gate.

FIG. 7 shows an example embodiment of a 2-D matrix of range gates 300 and Doppler gates 310, derived with the method discussed with respect to FIG. 3 and FIG. 4. The example embodiment further assumes three physical transmit channels 20, one virtual channel and one receiver. The offset frequency is given by the following equation (4), wherein m=0, 1, 2, 3 and corresponds to each physical and virtual transmit channel 20:

$$Foffset=m*Fprf/(M+1) \quad (4)$$

In equation (4), "M+1" offset frequencies are specified, however only "M" FMCW signals are transmitted. Therefore, there will be M replicas of the Doppler spectrum occupying "M" of the "M+1" possible positions. For example, in a system where only a single reflector is present with zero relative radial velocity and three transmit channels 20 are used, the Doppler spectrum would contain a reflector 320 at 0 Hz Doppler, a reflector 324 at Fprf/2 Hz Doppler and a reflector 322 at Fprf/4 Hz Doppler. However, there will not be a reflector located at −Fprf/4 Hz Doppler. Note, that the reflector 326 at −Fprf/2 Hz Doppler and the reflector 324 at Fprf/2 Hz Doppler are the same reflector.

When an object detector is applied to the range gates 300, three positive detections are made at indices 1 (e.g., 0*Nchirp+1), ½*Nchirp+1, ¾*Nchirp+1, (and Nchirp where the reflector at index 1 and Nchirp are the same reflector). There is a specific use for decreasing the frequency offset between the transmitters. As illustrated in the example embodiment, there will not be a detection at ¼*Nchirp+1. This can be exploited to detect and correct the ambiguity in the velocity measurement by assigning this unused code to the virtual channel.

Figure 8:
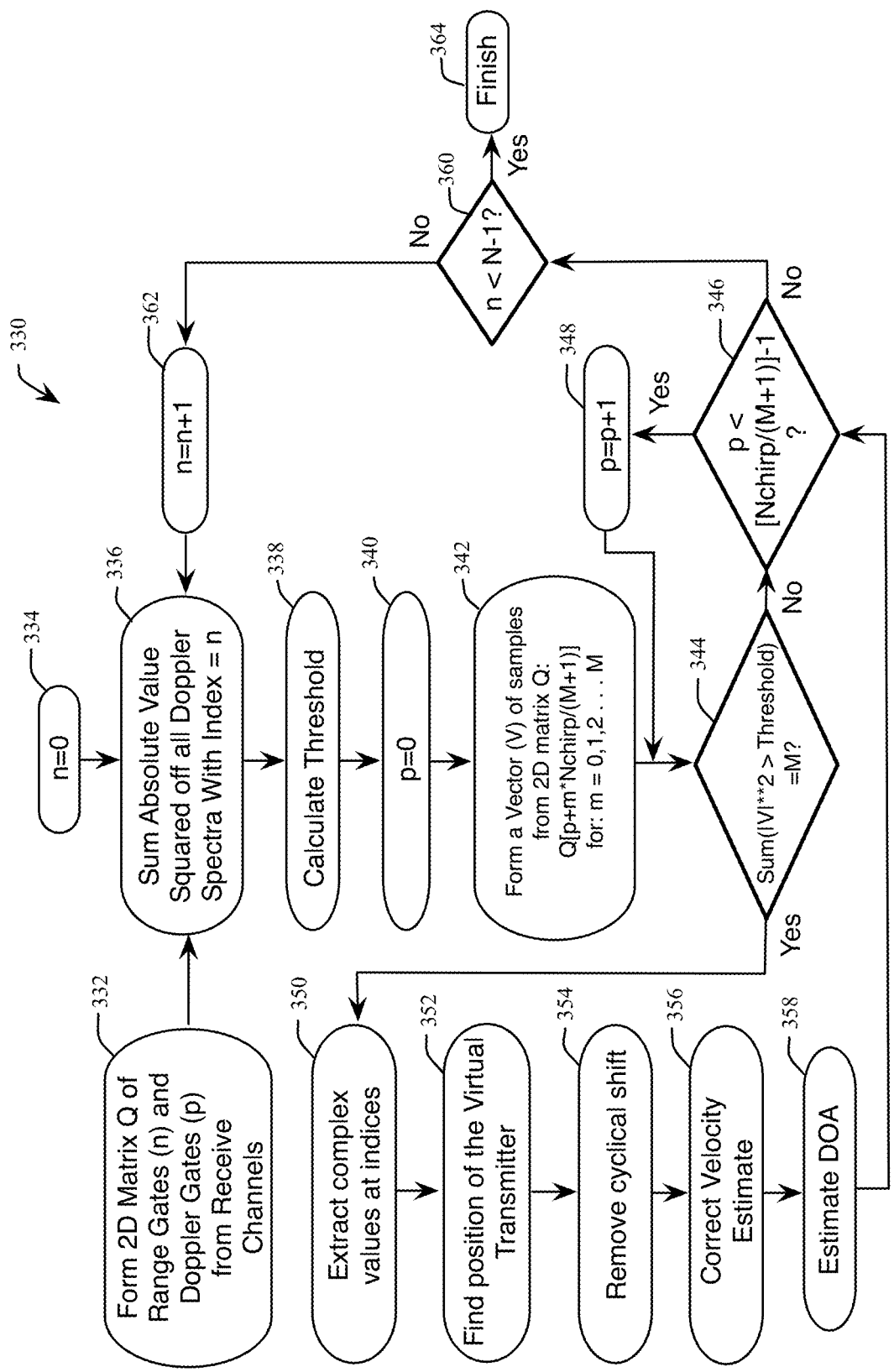
FIG. 8 is a flowchart representation of a method for MIMO RADAR coding for resolving velocity ambiguity, in accordance with an embodiment of the present disclosure.

FIG. 8 shows an embodiment 330 of a method for resolving velocity ambiguity in a MIMO RADAR system. At 332, at 2-D matrix "Q" is formed from the data received at the receive channels 48. The formation of matrix Q is detailed in the description of FIG. 3 and FIG. 4. Matrix Q includes a plurality of complex data arranged in rows defining range gates (n), and columns defining Doppler gates (p). Each Doppler gate includes a plurality of complex valued samples have a frequency range covering each transmitted signal with their respective frequency offsets to ensure orthogonality between transmit channels 20. The complex data is processed by an outer loop indexed by each range gate "n", and an inner loop indexed by each Doppler gate "p".

At 334, the range gate index is initialized to "0". At 336, a sum is formed over the Doppler spectra corresponding to the plurality of receivers for range gate "n" converted to its absolute value, then squared (e.g., "summing an absolute value squared"). The summation formed at 336 is used to define a noise power threshold at 338 based on the Constant False Alarm Rate (CFAR) principles. In one embodiment, an Ordered Statistics CFAR method is used, wherein summation excludes the complex value under test and its immediate neighboring "guard cells." In another embodiment, for design simplicity, all complex values associated with indexed range gate are used for the summation.

At 340, the Doppler gate index is initialized to "0". At 342, a first vector of length "M" is formed by selecting complex valued samples from the 2D matrix "Q" at indices given by the following equation (5):

$$V1[m]=Q[p+m*Nchirps/(M+1)] \quad (5)$$

For equation (5) "m" corresponds to each physical and virtual transmit channel 20. For example, a RADAR system with three physical transmit channels 20 and one virtual transmit channel, will index "m" from "0" to "3". At 344, a second vector is formed by squaring the absolute value of the first vector for each index "m" according to the following equation (6):

$$V2[m]=|V1[m]|^2 \quad (6)$$

The second vector V2 represents the power value of each of the indices "m" for a Doppler gate. In some embodiments V2 is derived directly with the elements of V1. At 344, each of the "m" indices of V2 is compared against the noise power threshold determined in 338. If the summation of indexed values of V2 equals "M", then a target has been found at the indexed Doppler gate "p". For example, for three physical transmit channels 20, the summation of V2[m] exceeding the noise power threshold equals three. If the result of the decision 344 is true, then the method 330 proceeds to 350 to execute a cyclical shift correction method. Otherwise, the method continues to the decision 346 to determine if all of the Doppler gates for the indexed range gate "n" have been processed.

At 346, if the Doppler index is less than [Nchirp/(M+1)]−1 then the Doppler indexed is increased by one at 348 and the decision at 344 is reevaluated. Otherwise, all Doppler gates at the presently indexed range gate "n" have been processed and the method 330 proceeds to 360. At 350, the cyclical shift correction method begins by extracting complex values of the first vector V1 from the 2-D matrix Q.

At 352, the position of the complex value corresponding to the virtual transmitter is determined. In an example embodiment having a single reflector and the Doppler spectra as shown in FIG. 7, the virtual transmit channel will reside at the second transmit channel position (e.g. Tx2 270 as shown in FIG. 6). Accordingly, for a relative radial velocity of the reflector equal to zero, the following vector is obtained, as shown in equation (7), wherein a "1" value means V2 exceeds the noise power threshold at decision 344, otherwise the value is "0":

$$w[p]=[1,0,1,1] \quad (7)$$

However, for a reflector moving at a relative radial velocity exceeding Fprf/4 Hz Doppler the positions of the detections will cyclically shift. In this case the velocity has become ambiguous. Moreover, the mapping of transmitter channel 20 position to the position of complex values within a Doppler gate will be erroneous, leading to serious problems in the estimation of the direction of arrival. However, because we can find the position of the zero in equation (7) we can estimate the cyclical shift, and thus the velocity ambiguity. Hence, once the position of the zero has been found, it is compared to the position of a non-aliased reflector. The number of positions the zero has shifted left or right is a measure to the degree of ambiguity that has occurred. For example, if the detected vector corresponds to equation (8), the vector has cyclically shifted right by one position, (also described as "Nshift=1"), hence aliasing has occurred:

$$w[p]=[1,1,0,1] \quad (8)$$

The cyclical shift is removed at 354 by re-arranging the transmitter responses with in the vector obtained in 350, thus restoring the virtual array. Specifically, for the example shown with equations (7) and (8), the four complex values obtained from 350 are shifted right by one of four positions. This corrected vector is referred to as Direction Of Arrival (DOA) snapshot, and can be used to estimate the direction of arrival of signals reflected by the reflector with known techniques at 358. For example, in one embodiment, windowing and FFT operations are performed followed by a fine estimation of the spectral peak position.

In addition to correcting the cyclical shifts in the DOA snapshot, the position of the zero is used to remove the ambiguity in the velocity estimation at 356. For example, Nchirp waveforms make up the waveform sequence of a CPI, (see FIG. 2 and FIG. 5). Thus, the Doppler spectrum has Nchirp samples, and the corresponding relative velocity in m/s is given by equation (9):

$$v[p]=[p*co/[2*Fcenter*Tchirp*Nchirps]]-[co/[4*(M+1)*Fcenter*Tchirp]]+[Nshift*co/[2*(M+1)*Fcenter*Tchirp]] \quad (9)$$

Thus far, an embodiment with a single receive antenna case has been described. In embodiments with multiple receive antennas, a higher performance is achieved in DOA resolution and signal to noise ratio. Due to possible cyclical shifts, coherently combining multiple receive antenna signals will add additional complexity. Instead, a non-coherent addition is performed. To this extent, a 2-D FFT including windowing is applied to the signal of each receiving antenna separately. Thereafter, the absolute values squared of all 2-D spectra are added. Subsequently, the processing steps described above are followed. At the point where the DOA snapshot is formed, the processing deviates. Here, the complex valued samples of all 2-D spectra are used. To this extent, the snapshot is constructed by extracting the complex values from each 2-D spectrum at the relevant indices. The order in which these samples are placed into the snapshot depends on the array configuration.

The presented method works well if at a specific relative radial velocity only reflectors with the same velocity ambiguity factor are present. When two or more reflectors with different amounts of ambiguity are present, then the equation (8) will not contain a zero and may lead to erroneous results. In this situation a virtual array is not formed. Rather, the DOA is estimated by calculating the covariance matrix. Because multiple transmitters and receivers are available, multiple covariance matrices can be calculated. More specifically, if M transmitters and S receivers are available in total M covariance matrices of size S*S are averaged. Subsequently, the DOA of the multiple sources are estimated using methods such as Multiple Signal Classification (MUSIC). In this case the velocity will remain ambiguous. However, the velocity ambiguity can be removed by a tracking filter that evaluates the possible velocities over multiple measurements.

In an alternate embodiment to the method 330, the DOA estimate at 358 occurs before correcting the velocity estimate at 356 and after removing the cyclical shift at 354. After removing the cyclical shift at 354, correcting the velocity estimate at 356 and estimating the DOA at 358, the method 330 returns to the decision 346 to determine if all the Doppler gates, for a given range gate, have been processed. If the decision at 346 is "Yes", then additional Doppler gates are evaluated to detect additional reflectors. Otherwise, the method proceeds to decision 360 to determine if all the range gates have been processed. If the decision 360 is "No", then the range gate index "n" is incremented and the method continues to 336. Otherwise, the method continues to 364 where the method terminates.

Figure 9:
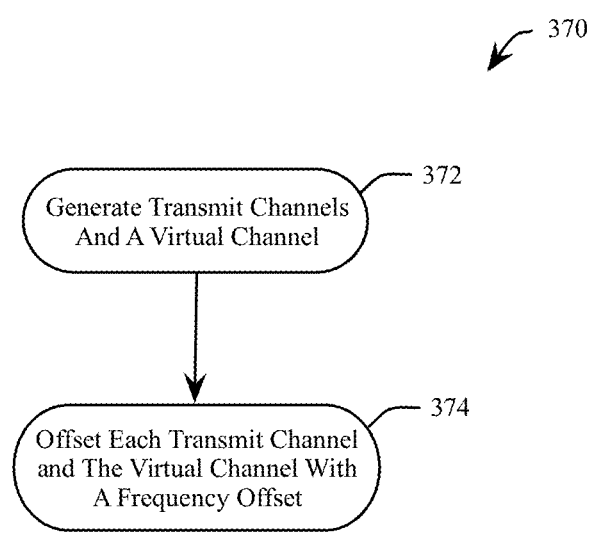
FIG. 9 is a flowchart representation of a method for MIMO RADAR coding for resolving velocity ambiguity, in accordance with an embodiment of the present disclosure.

The method 330 of FIG. 8 describes the various functions associated with the receive side of the MIMO RADAR 10. FIG. 9 shows a method 370 associated with the transmit side of the MIMO RADAR 10. With reference to FIG. 9, at 372, a plurality of transmit channels 20 and a virtual channel are generated. At 374, each transmit channel 20 and the virtual channel is offset with a frequency offset to ensure orthogonality between any of the transmit channels and the virtual channel.

The previously discussed embodiments describe the use of either a Fourier matrix or a selectable inventor for achieving orthogonality between each transmit and the virtual channel. An additional embodiment of FIG. 1, including the phase rotators 22 is described below. The use of the phase rotators 22 is well suited for RADAR front-ends that have limited phase shifting ability. In a system with three transmit channels, four frequency offsets are required using the phase shifts given in Table 1.

TABLE 1

Required phase shifts for a MIMO RADAR based upon DDMA with four transmitters.

|  | Tx1 | Tx2 | Tx3 | Tx4 |
|---|---|---|---|---|
| Beam 1 | 0 | 0 | 0 | 0 |
| Beam 2 | 180 | 270 | 0 | 90 |
| Beam 3 | 0 | 180 | 0 | 180 |
| Beam 4 | 180 | 90 | 0 | 270 |

In Table 1, columns Tx1, Tx2 and Tx4 correspond to physical transmit channels 20, while Tx3 is a virtual transmit channel. The rows of Table 1 include four sequentially formed beams that form a repeating pattern. In various embodiments, each beam defines a different azimuth range for the RADAR to scan. Table 1 will require four different phase shifts, while only two are available with the phase rotators 22. By using a Walsh-Hadamard encoding matrix, shown in Table 2 below, the required orthogonality is achieved.

TABLE 2

4x4 Walsh Hadamard encoding phase shift matrix.

|  | Tx1 | Tx2 | Tx3 | Tx4 |
|---|---|---|---|---|
| Beam 1 | 0 | 0 | 0 | 0 |
| Beam 2 | 0 | 180 | 0 | 180 |
| Beam 3 | 0 | 0 | 180 | 180 |
| Beam 4 | 0 | 180 | 180 | 0 |

The response of the system with transmitters encoded with columns 1 or 2 to a single reflector corresponds to a single spectral peak in the Doppler spectrum. However, columns 3 and 4 correspond to square waves. The spectrum of a square wave is symmetric. Hence, columns 3 and 4 correspond to two spectral peaks at −Fprf/4 Hz Doppler and Fprf/4 Hz Doppler. Consequently, the transmitters using columns 3 and 4 results in equal positions in the Doppler spectrum. However, there is 90 degrees phase between columns 3 and 4, therefore they are not identical and can be separated.

For the encoding of three transmitters, columns 1, 3 and 4, or columns 2, 3, and 4 are used. The processing follows the same steps explained with FIG. 8. However, there is an additional post-processing step executed after the removal of the cyclical shift at 354, before correcting the velocity estimate at 356 and before estimating DOA at 358. This additional post-processing step separates the Doppler spectrum of columns 3 and 4 using the following equation (10)

$$[w[3],w[4]]=0.5*[w[3],w[4]]*[2\text{-}D \text{ Decoding Matrix}] \quad (10)$$

In equation (10), w[3] and w[4] refer to the complex values associated with columns 3 and 4 respectively. The 2-D Decoding Matrix is shown in Table 3 below.

TABLE 3

2-D Decoding Matrix for separating columns 3 and 4.

| | |
|---|---|
| 1 − j | 1 + j |
| 1 + j | 1 − j |

For certain angles of departure, the addition of columns 3 and 4 results in the destruction of one of the two Doppler spectrum replicas. In this case, the vector shown in equations (7) and (8) will result in only two detections. Accordingly, the missing detection is estimated by using the third highest value of the second vector show in equation (6) before the threshold test of 344 is applied.

As will be appreciated, embodiments as disclosed include at least the following. In one embodiment, a method for resolving velocity ambiguity in a MIMO RADAR comprises storing a plurality of complex values in a two-dimensional memory partitioned with a plurality of rows and a plurality of columns, each row representing a range gate indexed by a range index, each column representing a Doppler gate indexed by a Doppler index, and each Doppler gate further comprising the plurality of complex values indexed by one of a transmitter index and a receiver index, wherein the transmitter index corresponds to one of a plurality of transmitters of the MIMO RADAR and a virtual transmitter, the receiver index corresponds to one of a plurality of receivers of the MIMO RADAR, each range gate defines a distance between the MIMO RADAR and a reflector, and each Doppler gate defines a relative radial velocity between the MIMO RADAR and the reflector. For each range gate, performing a Constant False Alarm Rate (CFAR) method on a summation of an absolute value squared of each complex value for each receiver index to determine a noise power threshold. A first vector is formed including complex values for a subset of the Doppler gates wherein a size of the subset is equal to a number of chirps divided by a number of the transmitter indices. A second vector of power values is formed by squaring an absolute value of the respective complex values of the first vector. A cyclical shift is corrected for each transmitter index of the subset of the Doppler gates.

Alternative embodiments of the method for resolving velocity ambiguity in a MIMO RADAR comprising include one of the following features, or any combination thereof. Correcting the cyclical shift of each transmitter index comprises comparing each power value of the second vector with the noise power threshold to determine the transmitter index of the virtual transmitter in the second vector, the power value of the virtual transmitter being less than the noise power threshold, determining the cyclical shift between the transmitter index of the virtual transmitter, and a reference index of the virtual transmitter determined by a coding of the transmitters, and rotating the transmitter index of the first vector by the cyclical shift to form a direction of arrival (DOA) snapshot defining an angle between a first path connecting the reflector to a receiver of the MIMO RADAR and a second path connecting the receiver to a reference plane. A velocity ambiguity is removed from a velocity estimate of the reflector by adding a velocity correction equal to the maximum velocity range, detectable by the MIMO RADAR, multiplied by the cyclical shift. The complex values of the first vector are determined by multiplying the respective transmitter index by the number of the plurality of chirps, and dividing by the number of transmitter indices. The complex values are generated by a first Fast Fourier Transform (FFT) followed by a second FFT, the first FFT transforming a plurality of time-domain samples of a receive channel of the receiver into the plurality of range gates stored sequentially in respective rows of the two-dimensional memory, the second FFT transforming each column of the two-dimensional memory into the plurality of Doppler gates stored sequentially in respective columns of the two-dimensional memory as the complex values. The receive channel includes a reflection of the plurality of chirps reflected by the reflector, each chirp having a first frequency ramp for detecting the reflector, and a second frequency ramp for resetting the chirp. Each transmitter transmits a frequency ramp including a frequency offset equal to a fraction of an inverse of a duration of the frequency ramp, the subset of the Doppler gates corresponding to complex values having the frequency offset. The respective frequency offset is generated with a Fourier matrix. A receive channel of the receiver is demodulated with a local oscillator (LO) signal to form a plurality of demodulated signals, the demodulated signals are converted to the plurality of complex values, and the LO signal is converted to a respective transmit channel of the plurality of transmitters. Converting the plurality of demodulated signals to the plurality of complex values includes filtering the demodulated signals with a low pass filter and sampling with an Analog to Digital Converter (ADC).

In another embodiment, an apparatus for resolving velocity ambiguity in a MIMO RADAR comprises a plurality of transmit channels and a virtual channel, wherein each transmit channel comprises a transmit antenna configured to transmit a plurality of chirps, and each chirp includes a frequency ramp of a transmit frequency of the respective transmit channel, and each transmit channel is orthogonal to another transmit channel and orthogonal to a virtual transmit channel A waveform generator is configured to generate a local oscillator (LO) signal for each transmit channel. A frequency offset circuit is configured to modify the LO signal of each transmit channel with a respective frequency offset to generate the respective transmit frequency.

Alternative embodiments of the apparatus for resolving velocity ambiguity in a MIMO RADAR include one of the following features, or any combination thereof. A plurality of receive channels, wherein each receive channel comprises: a receive antenna configured to receive a reflection of the plurality of chirps by a reflector and to generate a received signal, a mixer configured to demodulate the received signal with the LO signal to generate a demodulated signal, and an Analog to Digital Converter (ADC) configured to sample the demodulated signal to generate a plurality of time-domain samples of the receive channel; and a processor configured to receive the time-domain samples and to generate a two-dimensional matrix of complex values from the time-domain samples, wherein each complex value is indexed by a range gate and a Doppler gate, and the processor is configured to determine a cyclical shift between Doppler gates of the complex values received by the receive channels, wherein each of the complex values are associated with a reflection from each transmit channel and the virtual transmit channel. The processor is configured to correct the cyclical shift of the complex values associated with the reflection of the plurality of chirps and to form a direction of arrival (DOA) snapshot by combining a response from each of the receive channels, wherein the DOA snapshot defines an angle between a first path connecting the reflector to the receive antenna and a second path connecting the receiver antenna to a reference plane. The processor is configured to remove a velocity ambiguity from a velocity estimate of the reflector by adding a velocity correction equal to the maximum velocity range, detectable by the MIMO RADAR, multiplied by the cyclical shift. A memory configured to store the two-dimensional matrix of the complex values, wherein the memory is connected to the processor, and a system interface configured to receive a range of the reflector, a speed of the reflector and an angle of the reflector, wherein the system interface is connected to the processor, and wherein the angle is defined between a first path connecting the reflector to the receiver antenna and a second path connecting the receiver to a reference plane. The frequency offset circuit includes a phase rotator configured to invert a phase of the LO signal for each transmit channel for each chirp.

In another embodiment, a method for resolving velocity ambiguity in a MIMO RADAR comprises generating a plurality of transmit channels and a virtual channel. Each transmit channel comprises a plurality of chirps during a coherent processing interval. Each chirp is generated by ramping a transmit frequency with a frequency ramp. Each transmit channel is offset with a respective frequency offset equal to a fraction of an inverse of a duration of the frequency ramp.

Alternative embodiments of the method for resolving velocity ambiguity in a MIMO RADAR include one of the following features, or any combination thereof. The respective frequency offset is generated with a piecewise constant phase modulation by selectively rotating a respective phase of each transmit channel for each of the plurality of chirps, the transmit channels and the virtual channel are encoded with a Walsh-Hadamard matrix having four rows and four columns, wherein the four rows define a repeating sequence of four respective chirps including a first chirp, a second chirp, a third chirp and a fourth chirp, and wherein the first column defines a first phase sequence, the second column defines a second phase sequence, the third column defines a third phase sequence, the fourth column defines a fourth phase sequence, wherein none of the four chirps of the first phase sequence has an inverted phase, the second chirp and the fourth chirp of second phase sequence has the inverted phase, the third chirp and the fourth chirp of the third phase sequence has the inverted phase, and the second chirp and the third chirp of the fourth phase sequence has the inverted phase. The four columns are assigned to one of the first column, the third column and the fourth column assigned to the plurality of transmit channels, and the second column assigned to the virtual channel, and the second column, the third column and the fourth column assigned to the plurality of transmit channels, and the first column assigned to the virtual channel. A cyclical shift of the Doppler frequencies of the respective transmit channels is corrected and the third column is separated from the fourth column with a decoding matrix.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for resolving velocity ambiguity in a Multiple-Input Multiple-Output (MIMO) RADAR system comprising a plurality of transmit and receive antennae forming a virtual array and a digital signal processor (DSP) including a two-dimensional memory, the method comprising:
   storing a plurality of complex values in the two-dimensional memory partitioned with a plurality of rows and a plurality of columns, each row representing a range gate indexed by a range index, each column representing a Doppler gate indexed by a Doppler index, and each Doppler gate further comprising the plurality of complex values indexed by one of a transmitter index and a receiver index, wherein the transmitter index corresponds to one of a plurality of transmitters of the MIMO RADAR system and a virtual transmitter, the receiver index corresponds to one of a plurality of receivers of the MIMO RADAR system, each range gate defines a distance between the MIMO RADAR system and a reflector, and each Doppler gate defines a relative radial velocity between the MIMO RADAR system and the reflector;
   for each range gate, 1) performing, by way of the MIMO RADAR system, a Constant False Alarm Rate (CFAR) method on a summation of an absolute value squared of each complex value for each receiver index, to determine a noise power threshold, 2) forming, by way of the MIMO RADAR system, a first vector including complex values for a subset of the Doppler gates, wherein a size of the subset equals a number of chirps divided by a number of the transmitter indices, and 3) forming, by way of the MIMO RADAR system, a second vector of power values by squaring an absolute value of the respective complex values of the first vector; and
   correcting a cyclical shift, by way of the MIMO RADAR system, for each transmitter index of the subset of the Doppler gates, wherein correcting the cyclical shift for each transmitter index comprises comparing each power value of the second vector with the noise power threshold to determine the transmitter index of the virtual transmitter in the second vector, a virtual transmit channel comprising the virtual waveform wherein the power value of the virtual waveform being less than the noise power threshold.

2. The method of claim 1 wherein said correcting the cyclical shift for each transmitter index further comprises:
   determining the cyclical shift between the transmitter index of the virtual transmitter, and a reference index of the virtual transmitter determined by a coding of the transmitters, and
   shifting the transmitter index of the first vector by the cyclical shift to form a direction of arrival (DOA) snapshot defining an angle between a first path connecting the reflector to a receiver of the MIMO RADAR and a second path connecting the receiver to a reference plane.

3. The method of claim 2 further comprising removing a velocity ambiguity from a velocity estimate of the reflector by adding a velocity correction equal to the maximum velocity range, detectable by the MIMO RADAR, multiplied by the cyclical shift.

4. The method of claim 1 wherein the complex values of the first vector are determined by multiplying the complex value associated with the respective transmitter index by the number of the plurality of chirps, and dividing by the number of transmitter indices.

5. The method of claim 1 further comprising generating the complex values by a first Fast Fourier Transform (FFT) followed by a second FFT, the first FFT transforming a plurality of time-domain samples of a receive channel of the receiver into the plurality of range gates stored sequentially in respective rows of the two-dimensional memory, the second FFT transforming each column of the two-dimensional memory into the plurality of Doppler gates stored sequentially in respective columns of the two-dimensional memory as the complex values.

6. The method of claim 5 wherein the receive channel includes a reflection of the plurality of chirps reflected by the reflector, each chirp having a frequency ramp for detecting the reflector, and a reset time for resetting the chirp.

7. The method of claim 1 wherein each transmitter transmits a frequency ramp including a frequency offset equal to a fraction of an inverse of a duration of the frequency ramp, the subset of the Doppler gates corresponding to complex values having the frequency offset.

8. The method of claim 7 further comprising generating the respective frequency offset with a Fourier matrix.

9. The method of claim 1 further comprising:
demodulating a receive channel of the receiver with a local oscillator (LO) signal to form a plurality of demodulated signals;
converting the demodulated signals to the plurality of complex values; and modulating the LO signal to a respective transmit channel of the plurality of transmitters.

10. The method of claim 9 wherein converting the plurality of demodulated signals to the plurality of complex values includes filtering the demodulated signals with a low pass filter and sampling with an Analog to Digital Converter (ADC).

11. An apparatus for resolving velocity ambiguity in a MIMO RADAR comprising:
a plurality (N) of transmit channels, wherein a waveform coding for the MIMO RADAR is performed assuming N+1 transmit channels, wherein each one of the N transmit channels each transmit the coded waveform of a different one of the (N+1) encoded waveforms, and wherein the (N+1)'h encoded waveform is not transmitted, but comprises a virtual channel, wherein
each transmit channel comprises a transmit antenna configured to transmit a plurality of chirps, and
each chirp comprises a frequency ramp of a transmit frequency of the respective transmit channel, and
each transmit channel waveform is orthogonal to another transmit channel waveform and orthogonal to the virtual channel waveform;
a waveform generator configured to generate a local oscillator signal (LO) for each transmit channel; and
a frequency offset circuit configured to modify the LO signal of each transmit channel with a respective frequency offset to generate the respective transmit frequency.

12. The apparatus of claim 11 further comprising:
a plurality of receive channels, wherein each receive channel comprises:
a receive antenna configured to receive a reflection of the plurality of chirps by a reflector and to generate a received signal,
a mixer configured to demodulate the received signal with the LO signal to generate a demodulated signal, and
an Analog to Digital Converter (ADC) configured to sample the demodulated signal to generate a plurality of time-domain samples of the receive channel; and
a processor configured to generate a two-dimensional matrix of complex values from the time-domain samples, wherein each complex value is indexed by a range gate and a Doppler gate, and
the processor is configured to determine a cyclical shift between Doppler gates of the complex values received by the receive channels, wherein each of the complex values are associated with a reflection from each transmit channel and the virtual transmit channel.

13. The apparatus of claim 12 wherein the processor is configured to correct the cyclical shift of the complex values associated with the reflection of the plurality of chirps and to form a direction of arrival (DOA) snapshot by combining a response from each of the receive channels, wherein the DOA snapshot defines an angle between a first path connecting the reflector to the receive antenna and a second path connecting the receiver antenna to a reference plane.

14. The apparatus of claim 12 wherein the processor is configured to remove a velocity ambiguity from a velocity estimate of the reflector by adding a velocity correction equal to the maximum velocity range, detectable by the MIMO RADAR, multiplied by the cyclical shift.

15. The apparatus of claim 11 further comprising:
a memory configured to store the two-dimensional matrix of the complex values, wherein the memory is connected to the processor, and wherein the processor is further configured to provide a range of the reflector, a speed of the reflector and an angle of the reflector, wherein the system interface is connected to the processor, and wherein the angle is defined between a first path connecting the reflector to the receiver antenna and a second path connecting the receiver to a reference plane.

16. The apparatus of claim 11 wherein the frequency offset circuit includes a phase rotator configured to invert a phase of the LO signal for each transmit channel for each chirp.

17. A method for resolving velocity ambiguity in a MIMO RADAR comprising:
generating a plurality of transmit channels and a virtual channel, each transmit channel comprising a plurality of chirps during a coherent processing interval, each chirp generated by ramping a transmit frequency with a frequency ramp;
offsetting each transmit channel with a respective frequency offset equal to a fraction of an inverse of a duration of the frequency ramp;
generating the respective frequency offset with a piecewise constant phase modulation by selectively rotating a respective phase of each transmit channel for each of the plurality of chirps; and
encoding the transmit channels and the virtual channel with a Walsh-Hadamard matrix having four rows and four columns, wherein the four rows define a repeating sequence of four respective chirps including a first chirp, a second chirp, a third chirp and a fourth chirp, and wherein the first column defines a first phase sequence, the second column defines a second phase sequence, the third column defines a third phase sequence, the fourth column defines a fourth phase sequence, wherein:

none of the four chirps of the first phase sequence has an inverted phase, the second chirp and the fourth chirp of second phase sequence has the inverted phase, the third chirp and the fourth chirp of the third phase sequence has the inverted phase, and the second chirp and the third chirp of the fourth phase sequence has the inverted phase.

18. The method of claim 17 wherein the four columns are assigned to one of:

the first column, the third column and the fourth column assigned to the plurality of transmit channels, and the second column assigned to the virtual channel, and the second column, the third column and the fourth column assigned to the plurality of transmit channels, and the first column assigned to the virtual channel.

19. The method of claim 17 further comprising correcting a cyclical shift of the Doppler frequencies of the respective transmit channels and separating the third column from the fourth column with a decoding matrix.

\* \* \* \* \*